Patented Dec. 29, 1925.

1,567,731

UNITED STATES PATENT OFFICE.

FRITZ GÜNTHER, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

VALUABLE COMPOUND FOR DYEING.

No Drawing.  Application filed June 8, 1925. Serial No. 35,790.

*To all whom it may concern:*

Be it known that I, FRITZ GÜNTHER, citizen of the German Empire, residing at Ludwigshafen-on-the-Rhine, Germany, have invented new and useful Improvements in Valuable Compounds for Dyeing, of which the following is a specification.

I have found that very valuable products for dyeing can be obtained by the action of a carbonic acid halogenid on aromatic ortho-amino-carboxylic acids other than the uncolored anthranilic acids. By the term carbonic acid halogenid I wish to include both the dihalogenids (phosgene) and monohalogenids (alkyl-chloroformates). The products so obtained which represent derivatives of the isatoic anhydride, possess the valuable property of chemically combining with cellulose or other carbohydrates, probably forming a kind of esters of amino-arylcarboxylic acid and thus making the dyed material a part of the dyestuff molecule itself. The carbohydrate compounds can be further altered, for example by diazotizing (when diazotizable amino groups are present) and combining with components, or by acting on them (when containing alkylated or arylated amino-groups or hydroxyl groups) with diazo-compounds. Such products as are derived from azo-dyestuffs containing a carboxylic group with an amino group in the ortho position, are particularly valuable for producing dyeings.

In order to more fully illustrate the invention and the manner of carrying it into effect, the following examples are given to which the invention, however, is not limited. The parts are by weight.

Example 1.

50 parts of the azo dyestuff from diazotized sulfanilic acid and anthranilic acid (as a sodium salt) are dissolved in about 500 parts of water. Phosgene is then passed into the solution, while keeping it weakly alkaline by gradually adding sodium carbonate solution, until a test portion of the solution can no longer be diazotized by adding sodium nitrite and hydrochloric acid. The new dyestuff corresponding to the formula

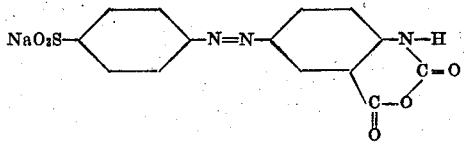

is then completely separated by adding salt, filtered off and washed with dilute salt solution until neutral, and dried with caution at a moderate temperature.

In other cases the process can be carried out in a similar manner, for example with the azo-dyestuff from 1-amino-2-chloro-benzene-5-sulfonic acid (diazotized) and anthranilic acid, which yields an isatoic acid derivative of the structural formula

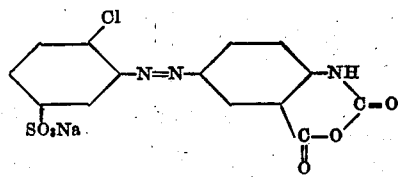

Preparation of the cellulose compound, or dyeing the cellulose, with the aforesaid compound from sulfanilic acid may be carried out by dissolving 3 parts thereof in 1000 parts of water of room temperature, and handling in the solution 100 parts of cotton for about one hour, while slowly adding a solution of 1,5 parts of calcined sodium carbonate, so as to keep the bath in a very weakly alkaline condition. An addition of neutral salts, such as common salt, Glauber's salt or others, proves useful. The dyed cotton is then carefully washed and dried and shows an intense yellow color. By diazotizing the fibre and developing, for example, with beta-naphthol, an intense bright red can be produced.

Example 2.

10 parts of 2.3-naphthylamine-carboxylic acid sodium salt are dissolved in 100 parts of water and treated with phosgene and sodium carbonate as described in the foregoing example. The compound produced corresponds to the formula

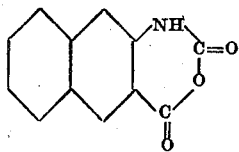

The compound is uncolored, also its cellulose derivative, which, however, can be diazotized and coupled in the usual manner with azo dystuff components.

When employing ethyl-chloroformate instead of phosgene, the carboxylic acid is boiled with the ester for a sufficient time.

*Example 3.*

20 parts of para-nitro-anthranilic acid sodium salt are dissolved in 200 parts of water and treated with phosgene while maintaining the solution in a weakly alkaline condition until a test portion contains no diazotizable matter. The product corresponding to the formula

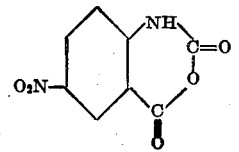

is precipitated by salt or acid, drawn off by suction, washed with dilute salt solution until neutral and dried with caution.

What I claim is:

1. A process of manufacturing valuable products for dyeing which consists in acting with a carbonic acid halogenid on an aromatic ortho-amino-carboxylic acid other than an uncolored anthranilic acid body.

2. A process of manufacturing valuable products for dyeing which consists in acting with a carbonic acid halogenid on an azo-compound containing the group NHX (X being hydrogen, alkyl or aryl) and the carboxylic acid group in ortho position thereto.

3. As new articles of manufacture, derivatives of isatoic anhydrid derived from an aromatic ortho-amino-carboxylic acid, other than an uncolored anthranilic acid body.

4. As new articles of manufacture, derivatives of isatoic anhydrid derived from an aromatic compound containing a carboxylic group and an NHX (X being hydrogen, alkyl or aryl) group in ortho position.

5. As new articles of manufacture, cellulose chemically combined with an ortho-amino-aryl-carboxylic acid.

6. As new articles of manufacture, cellulose chemically combined with an ortho-amino-aryl-carboxylic acid containing an azo group, and showing a dyed aspect.

In testimony whereof I have hereunto set my hand.

FRITZ GÜNTHER.